(12) United States Patent
Muhonen et al.

(10) Patent No.: US 7,076,254 B2
(45) Date of Patent: Jul. 11, 2006

(54) TELECOMMUNICATION NETWORK HAVING AT LEAST TWO NETWORK ENTITIES, AND COMMUNICATION METHOD

(75) Inventors: Ahti Muhonen, Hirvihaara (FI); Jonne Soininen, Helsinki (FI)

(73) Assignee: Nokia Corporation, Espoo (FI)

( * ) Notice: Subject to any disclaimer, the term of this patent is extended or adjusted under 35 U.S.C. 154(b) by 430 days.

(21) Appl. No.: 10/475,835

(22) PCT Filed: Apr. 25, 2001

(86) PCT No.: PCT/EP01/04690

§ 371 (c)(1),
(2), (4) Date: Oct. 24, 2003

(87) PCT Pub. No.: WO02/089508

PCT Pub. Date: Nov. 7, 2002

(65) Prior Publication Data

US 2004/0121779 A1    Jun. 24, 2004

(51) Int. Cl.
*H04Q 7/20* (2006.01)
(52) U.S. Cl. .................... 455/453; 455/445; 455/452.1
(58) Field of Classification Search ................ 455/453, 455/452.1, 445, 403, 423, 432.1, 434, 435.2, 455/436–438, 450, 464
See application file for complete search history.

(56) References Cited

U.S. PATENT DOCUMENTS 5,689,548 A    11/1997  Maupin et al.
2002/0069284 A1 *  6/2002  Slemmer et al. ............ 709/227
2003/0023747 A1 *  1/2003  Fouquet et al. ............. 709/238
2003/0055954 A1 *  3/2003  Kavanagh .................... 709/224
2003/0119512 A1 *  6/2003  Nakashima .................. 455/439
2003/0119519 A1 *  6/2003  Madour et al. ............. 455/453
2004/0014491 A1 *  1/2004  Weigand .................. 455/552.1
2004/0243720 A1 * 12/2004  Haumont et al. ........... 709/245
2005/0099990 A1 *  5/2005  Uusikartano et al. ....... 370/349
2005/0208950 A1 *  9/2005  Hasse ......................... 455/453
2005/0271038 A1 * 12/2005  Xin et al. .................... 370/351

FOREIGN PATENT DOCUMENTS

EP    0971509 A1    1/2000
WO    00/41414      7/2000

* cited by examiner

*Primary Examiner*—Sonny Trinh
(74) *Attorney, Agent, or Firm*—Squire, Sanders & Dempsey, L.L.P.

(57) ABSTRACT

The invention proposes a communication method and network having at least two network entities adapted to receive and/or transmit call-related information when handling a call connection, wherein at least one of the network entities is adapted to send load-related information regarding the load or condition of itself or of another network entity to a further network entity. The further network entity preferably contains a memory means for storing said load-related information. A load-information request message may be sent to another network entity as a separate message, or as part of another message. The response message returned from the addressed network entity may be returned as a separate message, or as part of another message. The network preferably is a packet-switched network, preferably a GPRS or UMTS network.

32 Claims, 2 Drawing Sheets

TELECOMMUNICATION NETWORK HAVING AT LEAST TWO NETWORK ENTITIES, AND COMMUNICATION METHOD

FIELD OF THE INVENTION

The invention relates to a communication network having at least two network entities adapted to receive and/or transmit call-related information when handling a call connection. Furthermore, the invention relates to a communication method providing or taking account of load-related information.

BACKGROUND OF THE INVENTION

Usually, the network elements involved in handling a connection or call, do not have information about the state and load conditions of other network elements. For instance, in a GPRS (General Packet Radio Service) or UMTS (Universal Mobile Telecommunications System) network, a SGSN (Serving GPRS Support Node) has no information about the load conditions and state of a GGSN (Gateway GPRS Support Node). The SGSN does neither know if the GGSN is overloaded or not, nor has it information on whether or not the GGSN is out of function because of e.g. a breakdown.

When trying to connect a call or modify an existing connection, the SGSN may for example try to open a PDP (Packet Data Protocol) context to a GGSN that is already overloaded or out of function. In such a case, the GGSN will either return a message rejecting the requested operation, or will not at all return any response.

The GGSN may also reject, when a SGSN is sending e.g. a request for creation or modification of a PDP context e.g. for real-time QoS (Quality of Service), such a request for various other reasons.

SUMMARY OF THE INVENTION

The present invention provides a communication network having at least two network entities adapted to receive and/or transmit call-related information when handling a call connection, at least one of the network entities preferably being adapted to communicate with another network entity arranged in another network when handling a call involving at least two networks, wherein at least one of the network entities is adapted to send load-related information regarding the load or condition of itself or of another network entity to a further network entity. The further network entity will therefore be informed on the state of another network entity and can take account thereof when e.g. establishing a next call or handling an actual connection.

The invention furthermore provides a method to be performed in a communication network having at least two network entities adapted to receive and/or transmit call-related information when handling a call connection, at least one of the network entities being adapted to communicate with another network entity arranged in the same or another network when handling a call involving one or more networks, wherein at least one of the network entities will send load-related information regarding the load or condition of itself or of another network entity to a further network entity.

Preferably, the further network entity contains a memory means for storing said load-related information so that this information has to be transmitted only once or at least with larger time intervals inbetween, reducing the network and processing load.

In a preferred embodiment, the load-related information is stored in the memory together with a time-to-live value. Older information will therefore automatically be considered as expired.

Preferably, a first one of the network entities, e.g. a user equipment, is adapted to send a connection-related message to a second network entity requiring or necessitating the establishment or modification of a connection to a third network entity, the second network entity being adapted to return a message to the first network entity which specifies another network entity or connection possibility different from the third network entity when the third network entity should be in a state which probably or certainly provides insufficient operation, such as high-load or overload or break-down condition. The probability of unsucccessful network operations as well as the network load can therefore be reduced. Furthermore, connections can be established in a shorter time because of reduction of the average number of unsuccessful trials.

In a preferred embodiment of the invention, at least one of the network entities is adapted to send a load-information request message to a further network entity requiring information on the load condition of the further network entity, the further network entity being adapted to return, as load-related information, a message to the request-message sending network entity, said message containing information on the load condition of the further network entity. At least some of the network entities can therefore actively collect information on the load or state condition of other network entities.

One or more of the network entities preferably are support nodes handling the connection to a user equipment.

According to one aspect of the present invention, at least one of the network entities of the communication network is adapted to send load-related information to a further network entity to inform the latter on the load or condition of the former network entity or another network entity. This load-related information can be taken into account when subsequently establishing or modifying a connection or connection conditions. The load-related information may e.g. define the actual load degree of a network entity such as the amount of presently reserved resources in relation to the total amount of resources. This information may be grouped into two or more load classes such as no load, normal load, high load, and overload. Such a load classification provides the advantage of representation of the load condition by only one or two bits (or more bits, depending on the fineness of classification). The additional information flow caused by the load-related information is essentially negligible in such a case.

The load-related information may alternatively or additionally consist in an information which notifies another network element about an address of a network entity such as a gateway support node which will probably be more suitable for successfully establishing a connection. Such an information may for instance be an access point name of a gateway adapted for accessing another network, such as an access point name for accessing a data network. This information is preferably sent after an unsuccessful trial of establishing or modifying a connection to a network entity such as an overloaded gateway node or a network entity being presently out of function.

The network entity receiving the load-related information will then have a higher probability of successfully establishing or modifying a connection within a short time interval and will reduce overall signalling and traffic otherwise caused by further unsuccessful connection trials.

The load-information request message may be sent, at an appropriate timing or in case of demand, as a separate message to the further network entity. Alternatively, or additionally, the load-information request message may also be sent as part of another message. For instance, the load-related information may e.g. be transmitted as part of e.g. a create, update, or delete PDP context request which will normally be sent from a serving support node to a gateway support node, in particular in a system according to the GPRS or UMTS standard, and will request the transmission of the load-related information.

The message returned as, or containing the, load-related information can be returned as a separate message, or as part of another message which may e.g. be a PDP context-related message such as a Create, Update, or Delete PDP Context message. This information will then be transmitted as part of the response message from the gateway support node to the serving support node.

The load-related information may be transmitted e.g. periodically or only in case of low network load. Alternatively, the load-related information may also be transmitted as part of another message which already has to be transmitted according to the network functional design. In the latter case, the transmission of the load-related information causes only insignificant additional network communication load.

The communication network may generally be a communication network of any type but is preferably a packet-switched network which, in a preferred embodiment, is a GPRS or UMTS network. The communication network will usually contain one or more gateway support nodes adapted to provide a connection to another network.

DETAILED DESCRIPTION OF PREFERRED EMBODIMENTS OF THE INVENTION

Figure 1:
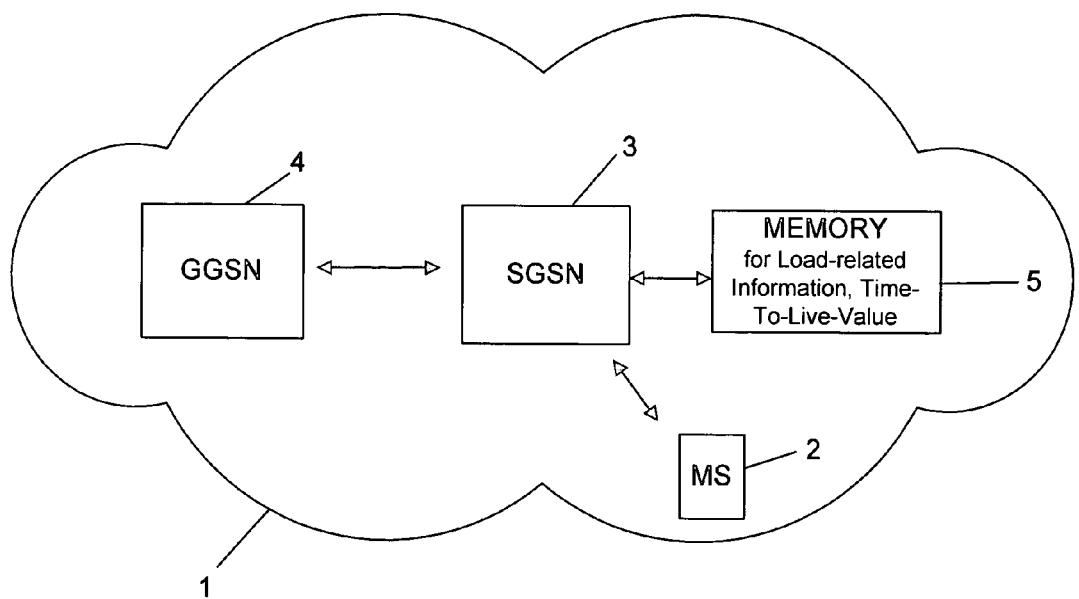
FIG. 1 shows a basic structure of an embodiment of a communication network in accordance with the present invention.

FIG. 1 shows an embodiment of a communication network which is implemented as network allowing packet data transfer, such as a GPRS (or UMTS) network 1. The network 1 comprises several network entities 2 to 4, i.e. one or more (normally a plurality of) mobile stations (MS) 2 representing user equipments, one or more support nodes 3 which function as serving support nodes (SGSN, i.e. serving GPRS support node) for the mobile stations 2, and at least one gateway support node (GGSN) 4 which is able to establish a connection to gateway devices of other communication networks (not shown). The support node(s) 3 comprise or cooperate with a memory 5 storing load-related information. Each support node 3 may have its own memory 5. Alternatively, several support nodes 3 may share a common memory 5. Apart from the memory 5 and the request/transmission of load-related information described below, the basic structure and functioning as well as the connection handling of and within the network 1 is known and will, therefore, not be described in further detail.

Figure 2:
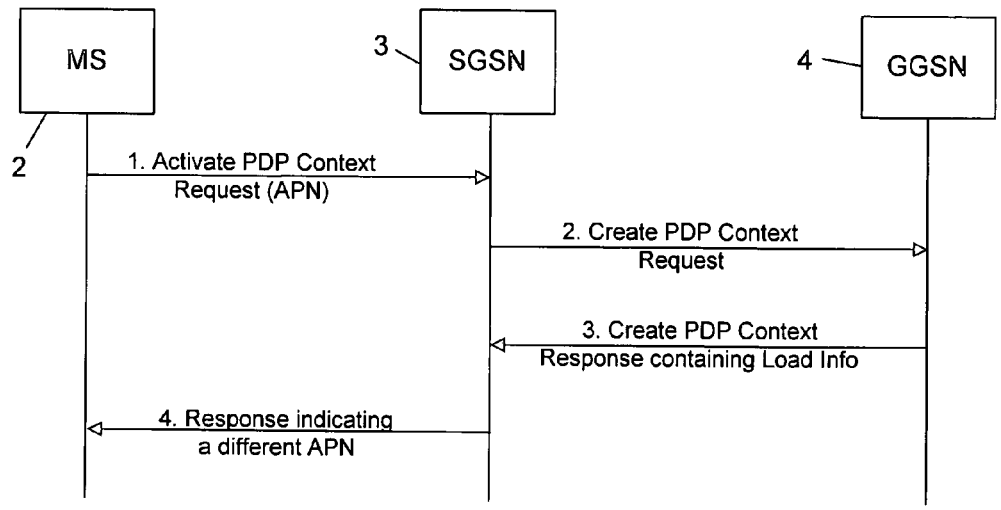
FIG. 2 shows an embodiment of a communication method, wherein the messages transmitted between network entities are shown.

FIG. 2 shows details of the message flow according to one embodiment of a communication method in accordance with the invention and performed in a network of a type such as shown in FIG. 1. When a connection is to be established, or an already established connection is to be modified upon request of the mobile station 2, the mobile station 2 sends, as step 1.), an "Activate PDP Context" request specifying, among other information, an access point name APN of an access point, typically the GGSN of the called or calling party or of the GGSN 4. The SGSN 3 receives this request and initiates a "Create PDP Context" procedure by sending, as next step 2.), a "Create PDP Context" request to the GGSN 4. The PDP context may e.g. be created or modified for real-time QoS.

The GGSN 4 can reject the creation or modification of the PDP context for various reasons, such as being overloaded, not having enough free resources or being out of order. The rejection of the request message of step 2.) may also be caused by unreachability or other reason of unavailability to initiate a connection with a network entity such as a gateway node of another network to which the MS 2 intends to get access. The GGSN 4 is adapted to return in such a case a response containing a load information such as a "Create PDP Context" response containing load-related information, as shown in step 3.) of FIG. 2. This response is a reject message rejecting the request of step 2.). When the SGSN 3 receives the reject message of step 3.), it forwards, in step 4.), the rejection message to the user equipment, here the mobile station 2.

The SGSN 3 preferably contains, e.g. in the memory 5, a list of alternative APNs e.g. for accessing the network to which the mobile station 2 tried to get access using the APN included in the message sent in step 1.). The SGSN 3 is adapted to select a different APN from this internally stored list, and includes, into the response to MS 2 sent in step 4.), a different APN allowing access to the same network as the one to which the APN sent in step 1.) provides access. As an example, the APN sent in step 4) is the APN of an alternative GGSN having higher probability of being available for the connection request of MS 2.

The MS 2 is preferably adapted to use this APN received in step 4.) for trying to make a new attempt to activate the PDP context with the GGSN indicated by the APN received from SGSN 3 in step 4.). The probability of success of this PDP context activation request will now be rather high, and at least higher than a random selection of a new APN by the MS 2.

This approach provides the additional advantage that the user equipment or mobile station 2 does not need to store a list of many APNs to connect to a GGSN.

In FIG. 2, the GGSN 4 indicated by the APN sent from MS 2 in step 1.) may be a gateway support node of the same network as the one to which the MS 2 is attached, or may be a gateway support node of another network such as a packet data network, e.g. a IP-based network, to which the MS 2 intends to be connected.

As an alternative to storing the APN list in the SGSN 3 for indicating a different APN in the response sent in step 4.), the GGSN 4 may sent, as load-related information or in addition to such an information, the APN of another gateway support node to which the MS 2 may try to get a successful connection. In such a case, the APN list will be stored in the GGSN 4.

In the embodiment of FIG. 2, the steps 1.) and 2.) may correspond to the usual steps customarily performed in a GPRS network, whereas steps 3.) and 4.) are different from the customarily performed steps in that, in step 3.), an additional load-related information is sent, and in step 4.) a different APN is included in the reject response.

In a case when the GGSN 4 should be out of function, it will probably not return any message, i.e. the message of step 3.) is not transmitted. For dealing with such a case, the GSN 3 preferably contains a timer means which starts when sending the message of step 2.) and is set to an appropriate time interval sufficient for receiving the response message of step 3.) in a normal situation. When the timer means expires without receipt of a response according to step 3.), the SGSN 3 is adapted to perform step 4.), i.e. to return, to the mobile station 2, the reject message indicating a different APN. In such a case, the load-related information is sent from SGSN 3 to MS 2 and is represented by the different APN signalling to the MS 2 that problems in the GGSN 4 have occurred.

The load information sent by GGSN 4 in step 3.) may be represented by one or more, e.g. two bits added to the customarily returned response message of step 3.). These bits may classify the actual load or condition of GGSN 4 into e.g. four traffic classes, for instance as follows: 00 no free capacity; 01 some free capacity; 10 enough free capacity; 11 all capacity free.

In an alternative embodiment, the number of traffic classes represented by the load information can also be higher or lower than four classes. The load information may for instance be coded into 8 bits.

Figure 3:
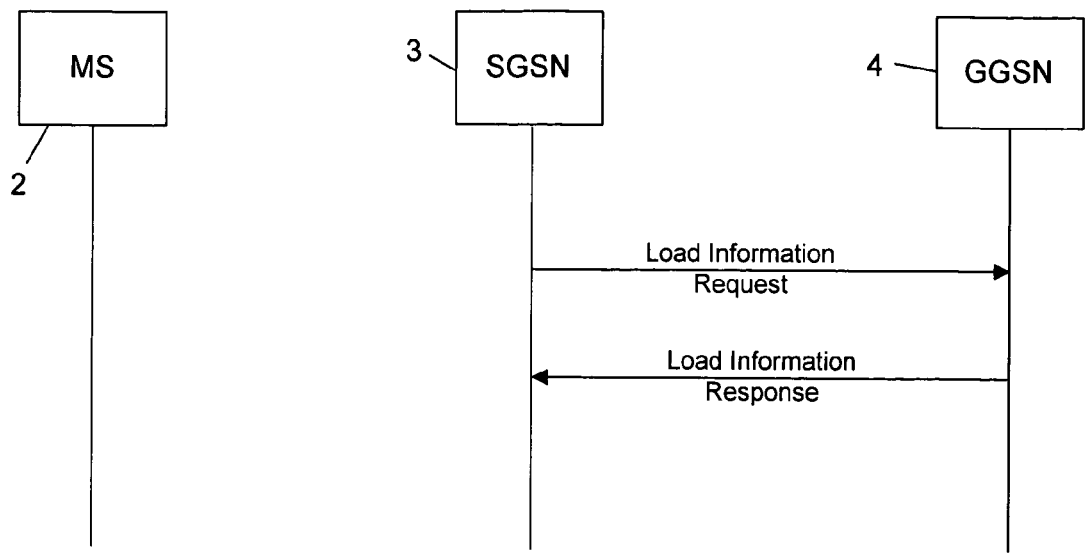
FIG. 3 illustrates another embodiment of a message flow between network entities.

FIG. 3 shows an embodiment of a communication method comprising, in addition to the usually provided request and response messages and information of other type, a dedicated "load information" request/response message pair. The SGSN 3 is adapted to generate a load information request message transmitted to the GGSN 4 which message may consist of a specific data structure or bit sequence. The GGSN 4 is adapted to generate, as reaction to the received load information request, a load information response containing information bits representing the actually load condition of the GGSN 4, and to return this response message to the SGSN 3. The load information bits of this load information response message may classify the actual load condition of GGSN 4 in several classes, as stated above. If the GGSN 4 should be out of order, it will not generate any load information response. The SGSN 3 is monitoring the time interval until receipt of the response message and will assume the condition of GGSN 4 to be out of order if no load information response is received within a predefined time interval after sending the load information request.

Preferably, the SGSN 3 is programmed to store the load information received from GGSN 4 in the load information response, or in the response messages shown in FIGS. 2 or 4 (to be explained below), in the memory 5 (FIG. 1) for a certain time. The SGSN 3 will also store, as load-related information, in memory 5 information on the "no response" state of a GGSN 4 in case the SGSN 3 does not receive any response to the load information request or other requests such as the requests shown in FIGS. 2 and 4 within the expected predefined time interval.

Preferably, the load-related information is stored with an additional time-to-live-value. The time-to-live-value may represent an expiry time after expiry of which the information will no longer be regarded as valid, or may represent the time of storage of the load-related information, wherein such information is only considered as valid when the storage time point lies within a definite time interval ending with the actual time point. This time-to-live-value ensures that too old load-related information will no longer will be regarded as valid, and will on the other hand reduce the number of load information requests and responses during the interval in which the load-related information is considered as valid.

When the time-to-live-value indicates expiry of the validity of the stored load-related information, the SGSN 3 may decide to request the GGSN 4 to refresh the information, either by sending a separate load information request, or by waiting for the necessity of sending a request of any other type to the GGSN 4 caused by other reasons such as a necessary "create PDP context" request, and may add the load information request to this message. When getting new load-related information, the SGSN 3 will store this information replacing the outdated previous load information in memory 5.

Figure 4:
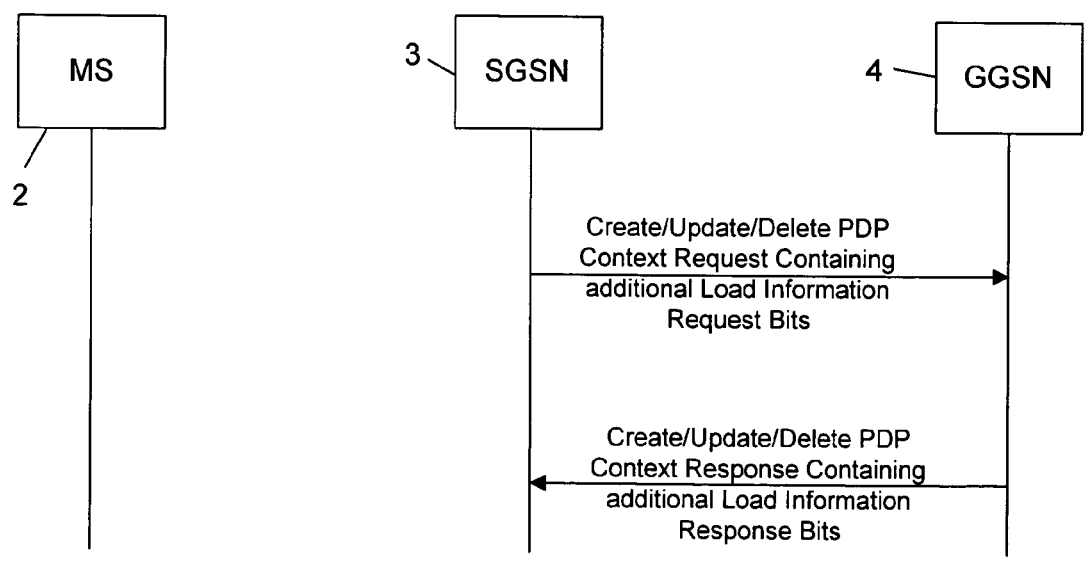
FIG. 4 shows a further embodiment in which load-related information is requested and transmitted as part of other messages.

FIG. 4 shows a further embodiment, wherein the load information request is sent as a part of another request such as a create or update or delete PDP context request. This request is designed to contain additional load information request bits signalling to the GGSN 4 the request for transmitting load-related information representing the actual load or condition of the GGSN 4.

The GGSN 4 is designed to respond to such a request by a) performing the requested action, and b) sending back a response message indicating the performed action, which response message contains additional load information response bits informing the SGSN 3 about the actual load condition of GGSN 4.

Although the above embodiments have been described by mainly referring to a GPRS network and the messages transmitted therein, the invention is also applicable to any other type of communication network such as GSM, circuit-switched network or packet-switched network.

The invention claimed is:

1. Communication network having at least two network entities adapted to receive and/or transmit call-related information when handling a call connection, wherein at least one of the network entities is adapted to send load-related information regarding the load or condition of itself or of another network entity to a further network entity wherein a first one of the network entities is a user equipment which is adapted to send a connection-related message to a second network entity requiring or necessitating the establishment or modification of a connection to a third network entity, the second network entity being adapted to return a message to the user equipment which specifies another network entity or connection possibility different from the third network entity when the third network entity should be in a high-load or overload or break-down condition, and wherein the connection-related message contains information on an access point name for accessing a data network.

2. Communication network according to claim 1, wherein the further network entity contains a memory means for storing said load-related information.

3. Communication network according to claim 2, wherein the load-related information is stored in the memory together with a time-to-live value.

4. Communication network according to claim 1, wherein at least one of the network entities is adapted to send a load-information request message to a further network entity requiring information on the load condition of the further network, the further network entity being adapted to return, as load-related information, a message to the request-message sending network entity, said message containing information on the load condition of the further network entity.

5. Communication network according to claim 4, wherein the load-information request message is sent as a separate message to the further network entity.

6. Communication network according to claim 4, wherein the load-information request message is sent as part of another message.

7. Communication network according to claim 6, wherein said another message is a Create, Update, or Delete PDP Context request.

8. Communication network according to claim 4, wherein said message returned as load-related information is returned as a separate message.

9. Communication network according to claim 4, wherein said message is returned as load-related information is returned as part of another message.

10. Communication network according to claim 9, wherein the another message is a Create, Update, or Delete PDP Context request.

11. Communication network according to claim 1, wherein at least one of the network entities is a support node handling the communication with a user equipment.

12. Communication network according to claim 1, wherein at least one of the network entities is a gateway support node adapted to provide a connection to another network.

13. Communication network according to claim 1, wherein the network is a packet-switched network, preferably a GPRS or UMTS network.

14. Communication method to be performed in a network having at least two network entity adapted to receive and/or transmit call-related information when handling a call connection, at least one of the network entities communicating with another network entity arranged in the same or another network when handling a call, wherein at least one of the network entities is adapted to send load-related information regarding the load or condition of itself or of another network entity to a further network entity,
wherein a first one of the network entities is a user equipment which sends a connection-related message to a second network entity requiring or necessitating the establishment or modification of a connection to a third network entity, the second network entity returning a message to the user equipment which specifies another network entity or connection possibility different from the third network entity when the third network entity should be in a high-load or overload or break-down condition, and
wherein the connection-related message contains information on an access point name for accessing a data network.

15. Communication method according to claim 14, wherein the further network entity stores said load-related information.

16. Communication network according to claim 15, wherein the load-related information is stored with lifetime indication.

17. Communication method according to claim 14, wherein, when at least one of the network entities is sending a load-information request message to a further network entity requiring information on the load condition of the further network entity, the further network entity returns, as a load-related information, a message to the request-message sending network entity, said message containing information on the load condition of the further network entity.

18. Communication method according to claim 17, wherein the load-information request message is sent as a separate message to the further network entity.

19. Communication method according to claim 17, wherein the load-information request message is sent as part of another message.

20. Communication method according to claim 19, wherein said another message is a Create, Update, or Delete PDP Context request.

21. Communication method according to claim 17, wherein said message returned as load-information is returned as a separate message.

22. Communication method according to claim 17, wherein said message returned as load-information is returned as pan of another message.

23. Communication method according to claim 22, wherein the another message is a Create, Update, or Delete PDP Context response.

24. Communication method according to claim 23, wherein said message returned as load-related information is returned as a separate message.

25. Communication method according to claim 23, wherein said message returned as load-related information is returned as part of another message.

26. Communication method according to claim 25, wherein the another message is a Create, Update, or Delete PDP Context response.

27. Communication method according to claim 17, wherein at least one of the network entities is a support node handling the communication with a user equipment.

28. Communication method according to claim 17, wherein at least one of the network entities is a gateway support node adapted to provide a connection to another network.

29. Communication method according to claim 17, wherein the network is a packet-switched network, preferably a GPRS or UMTS network.

30. Communication method according to claim 14, wherein at least one of the network entities is a support node handling the communication with a user equipment.

31. Communication method according to claim 14, wherein at least one of the network entities is a gateway support node adapted to provide a connection to another network.

32. Communication method according to claim 14, wherein the network is a packet-switched network, preferably a GPRS or UMTS network.

* * * * *